J. H. BOSCHEN.
Dry Stench-Trap.

No. 169,232. Patented Oct. 26, 1875.

Witnesses.
E. F. Kastenhuber
Otto Aufland

Inventor.
John H. Boschen
p.
Van Santvoord & Hauff
Attys

UNITED STATES PATENT OFFICE.

JOHN H. BOSCHEN, OF NEW YORK, N. Y.

IMPROVEMENT IN DRY STENCH-TRAPS.

Specification forming part of Letters Patent No. 169,232, dated October 26, 1875; application filed September 9, 1875.

*To all whom it may concern:*

Be it known that I, JOHN H. BOSCHEN, of the city of New York, in the county of New York and State of New York, have invented a new and Improved Dry Stench-Trap, which invention is fully set forth in the following specification, reference being had to the accompanying drawing, in which—

Figure 1:
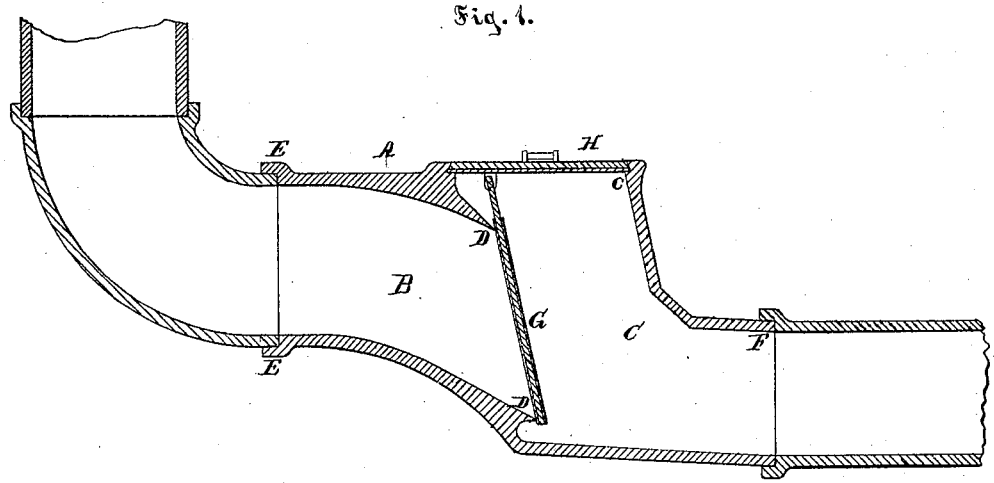
Figure 2:
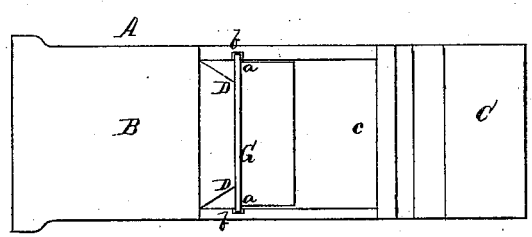

Figure 1 represents a longitudinal section. Fig. 2 is a plan or top view, the cover having been removed to expose the interior.

Similar letters indicate corresponding parts.

This invention consists in a stench-trap composed of a supply-chamber and of a discharge-chamber, both of which are provided with round ends, one to form the connection with the waste-pipe and the other to form the connection with the pipe leading in the sewer, while at the inner end of the supply-chamber is formed an inclined knife-edged valve-seat for a gravitating-valve, which swings in bearings formed in the discharge-chamber, and to which access can be had by means of a cover, which closes an opening in the top of said discharge-chamber, so that a trap is obtained which can be readily inserted between the waste-pipe and the sewer-connection, and which effectually prevents the escape of foul air, gas, or stench into the house, while at the same time convenient access can be had to the valve, for the purpose of keeping the same clean and free from impurities.

In the drawing, the letter A designates my trap, which is, by preference, cast in one solid piece, and which is composed of two chambers, B C, the chamber B forming the supply and the chamber C the discharge-chamber of the trap. Both these chambers are provided with round ends E F, by means of which my trap can be readily connected at the end E with the waste-pipe, and at the end F with the pipe leading to the sewer. At the inner end of the supply-chamber is formed an inclined knife-edged valve-seat, D, for a valve, G, which is hung on gudgeons *a*, having their bearings in recesses *b*, formed in the sides of the discharge-chamber C, said valve being so situated that when the trap is placed in the proper position it will close down upon its seat by its own inherent gravity.

The valve, instead of being hung on gudgeons, which have their bearings in recesses in the sides of the chamber C, as above stated, might be suspended in any other suitable manner without deviating from my invention.

In the top of the chamber C is an aperture, *c*, through which the valve G is introduced, and which is closed by a cover, H, said cover being firmly secured in position either by dovetailed guides, as shown, or by screws, or by any other suitable fastenings capable of producing a gas-tight joint between the inner surface of said cover and the edges of the aperture *c*. By removing this cover free access can be had to the valve, for the purpose of freeing the same from impurities, or for repairs.

By these means a trap is obtained which can be readily inserted in any pipe running from a sink or water closet to the sewer, and which effectually prevents the escape of foul air, gas, or stench into the house.

What I claim as new, and desire to secure by Letters Patent, is—

The chambers B C, the former of which is constructed with an inclined knife-edge valve-seat, D, projecting into the latter, in combination with the valve G hung in the chamber C, and adapted to set against said valve-seat, substantially as described.

In testimony that I claim the foregoing I have hereunto set my hand and seal this 6th day of September, 1875.

JOHN H. BOSCHEN. [L. S.]

Witnesses:
  W. HAUFF,
  E. F. KASTENHUBER.